(12) United States Patent
Clos

(10) Patent No.: US 11,952,145 B2
(45) Date of Patent: Apr. 9, 2024

(54) VEHICLE CARGO RESTRAINT SYSTEM

(71) Applicant: THE BOEING COMPANY, Chicago, IL (US)

(72) Inventor: William R. Clos, Mukilteo, WA (US)

(73) Assignee: The Boeing Company, Chicago, IL (US)

(*) Notice: Subject to any disclaimer, the term of this patent is extended or adjusted under 35 U.S.C. 154(b) by 1131 days.

(21) Appl. No.: 16/734,990

(22) Filed: Jan. 6, 2020

(65) Prior Publication Data
US 2021/0206493 A1 Jul. 8, 2021

(51) Int. Cl.
| | | |
|---|---|---|
| *B64D 9/00* | (2006.01) | |
| *B60P 7/08* | (2006.01) | |
| *B60P 7/10* | (2006.01) | |
| *B60P 7/13* | (2006.01) | |
| *B60P 7/15* | (2006.01) | |

(52) U.S. Cl.
CPC ............ *B64D 9/003* (2013.01); *B60P 7/0892* (2013.01); *B60P 7/10* (2013.01); *B60P 7/13* (2013.01); *B60P 7/15* (2013.01); *B64D 9/00* (2013.01); *B64D 2009/006* (2013.01)

(58) Field of Classification Search
CPC .... B64D 9/003; B64D 9/00; B64D 2009/006; B60P 7/0892; B60P 7/10; B60P 7/13; B60P 7/15; B60P 7/0815
See application file for complete search history.

(56) References Cited

U.S. PATENT DOCUMENTS

| | | | | |
|---|---|---|---|---|
| 3,778,012 A * | 12/1973 | Fernandez | ............ | B60P 7/0815 193/40 |
| 3,810,534 A * | 5/1974 | Prete, Jr. | ................... | B60P 7/08 410/69 |
| 3,986,460 A | 10/1976 | Voigt et al. | | |
| 4,234,278 A | 11/1980 | Harshman et al. | | |
| 4,349,168 A * | 9/1982 | Barnes | ..................... | B64D 1/10 410/105 |
| 4,379,668 A | 4/1983 | Pelletier | | |
| 2019/0301899 A1* | 10/2019 | Clos | ...................... | B64D 9/003 |

FOREIGN PATENT DOCUMENTS

GB 2043584 A 10/1980

OTHER PUBLICATIONS

U.S. Appl. No. 15/936,540, Cargo Restraint Assurance System, filed Mar. 27, 2018.
European Search Report for Application No. 20212576.1 dated May 21, 2021.

* cited by examiner

*Primary Examiner* — Lynn E Schwenning
(74) *Attorney, Agent, or Firm* — Quinn IP Law

(57) ABSTRACT

A cargo restraint system includes a cargo conveyor system, which has a plurality of rollers and a cargo restraint. The cargo restraint includes an inner pawl rotatably attached to the cargo conveyor system and an outer pawl rotatably attached to the cargo conveyor system. A lever is rotatably attached to the cargo loading system. A mechanical linkage connects the lever to the outer pawl and to the inner pawl, the outer pawl and the inner pawl being controlled by movement of the lever through the mechanical linkage.

21 Claims, 15 Drawing Sheets

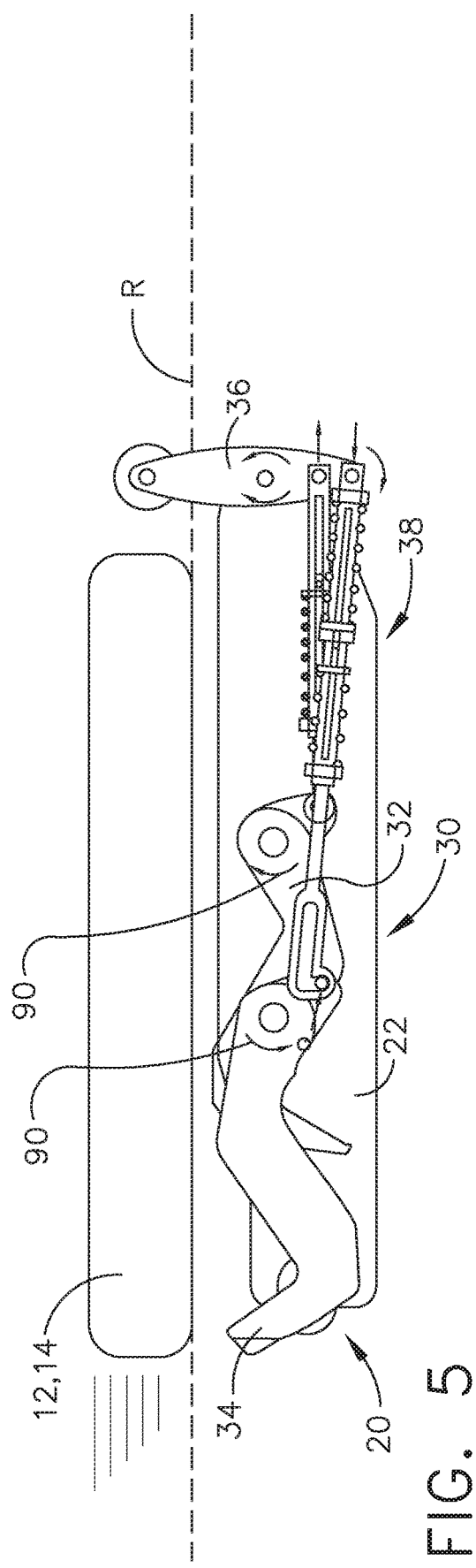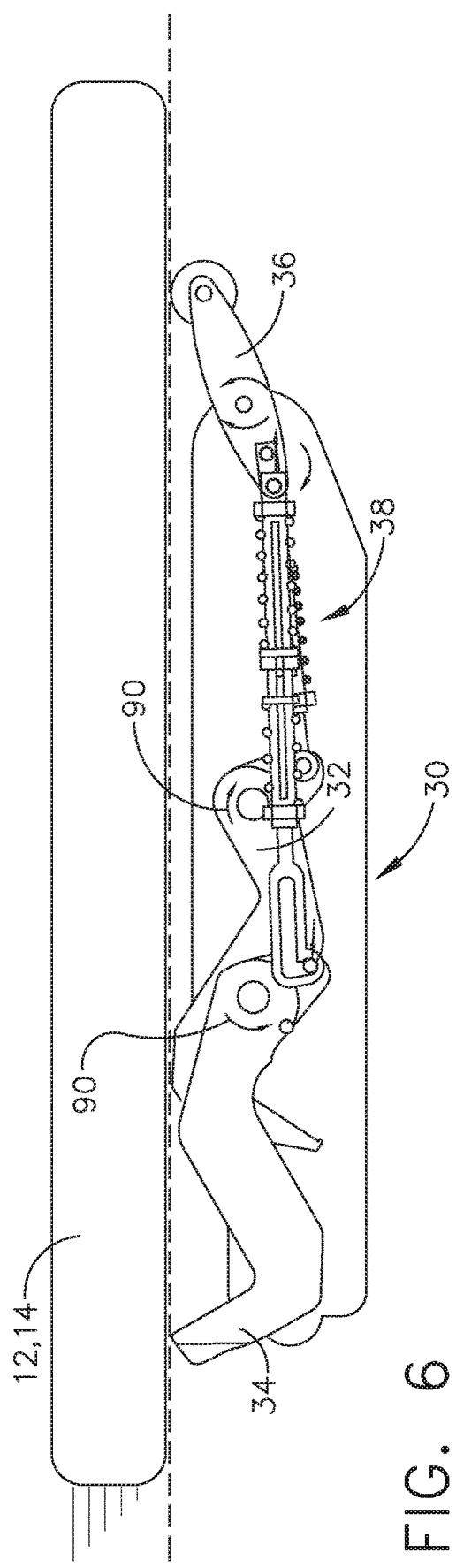

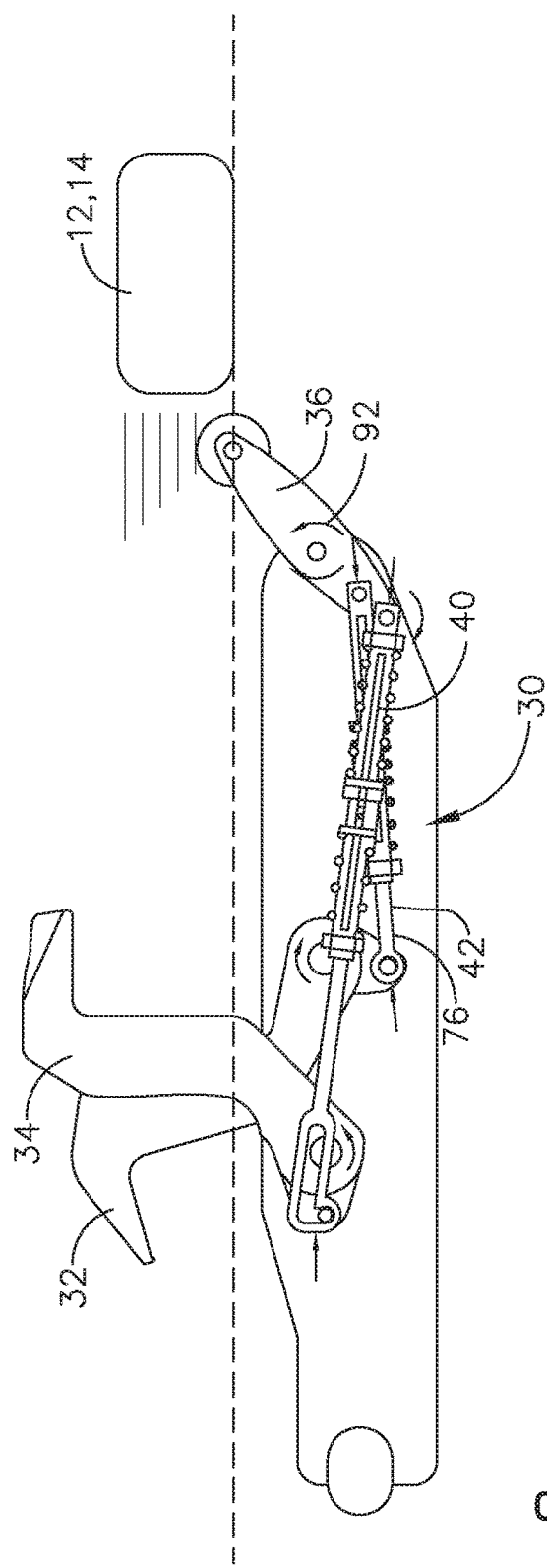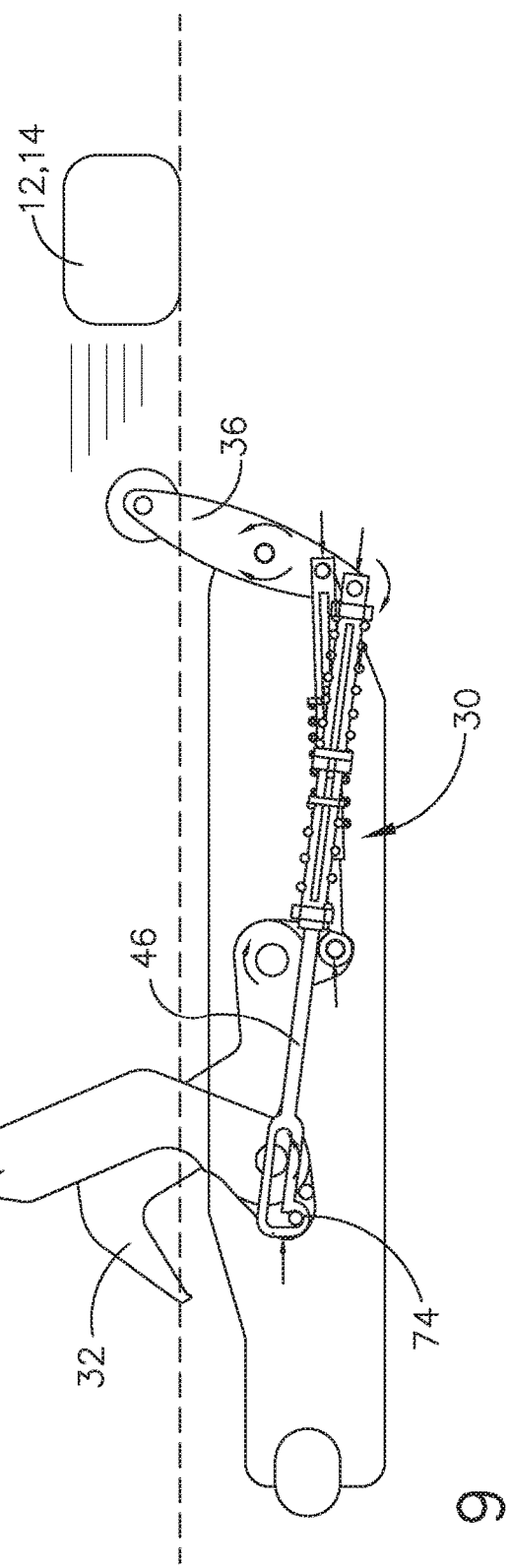

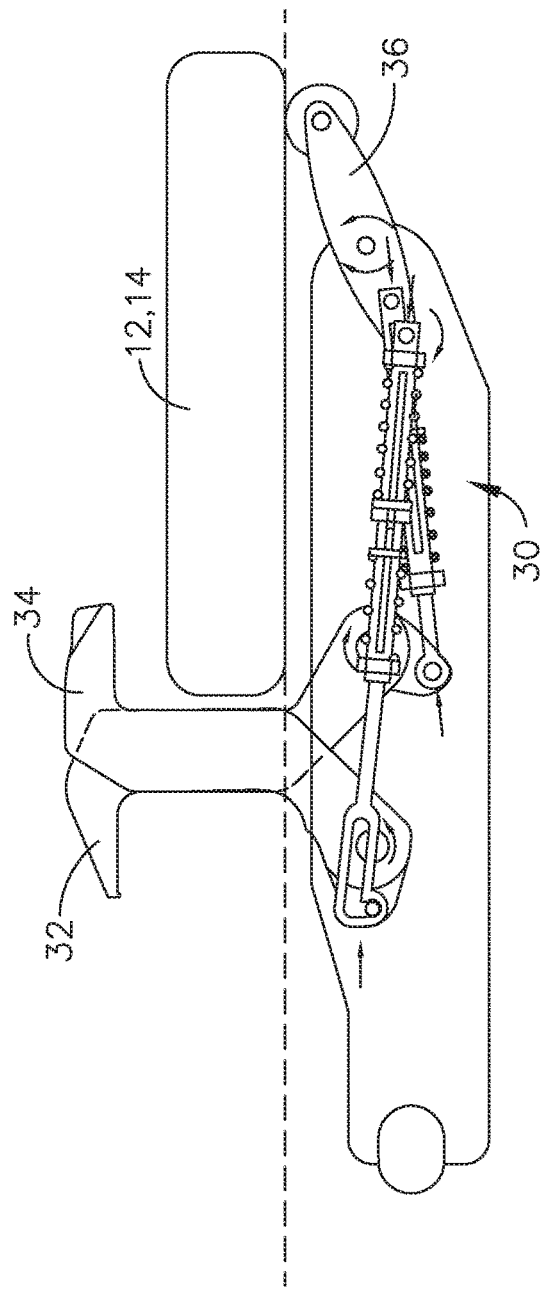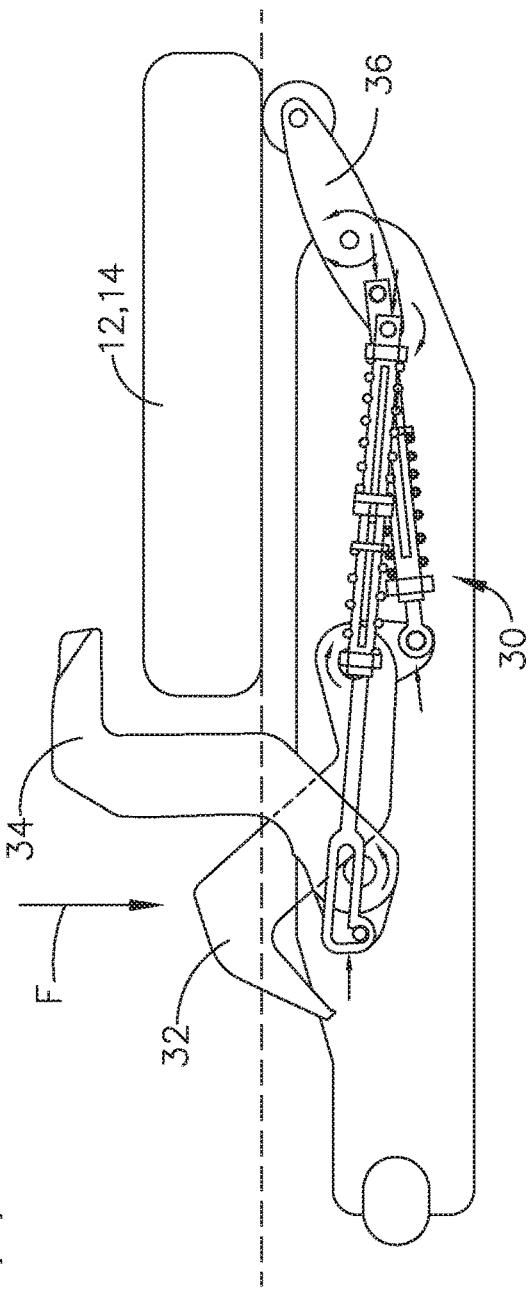

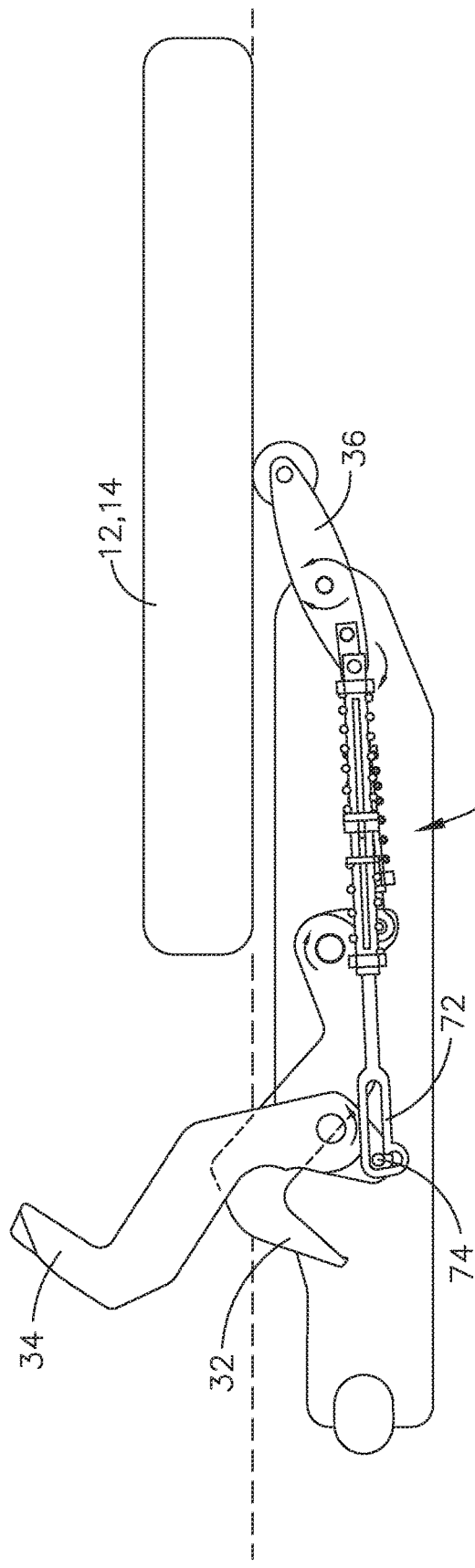
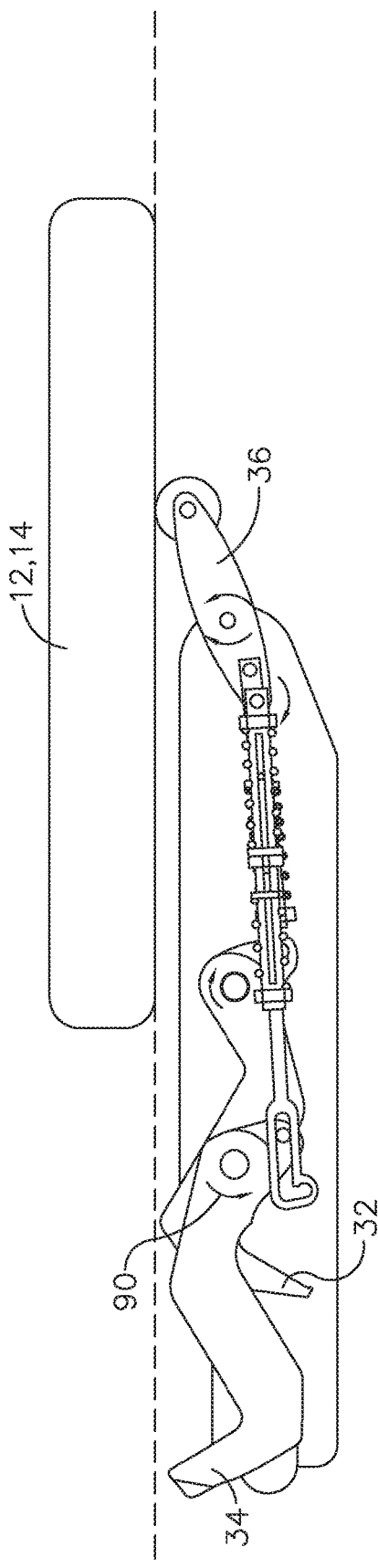
FIG. 13
FIG. 14

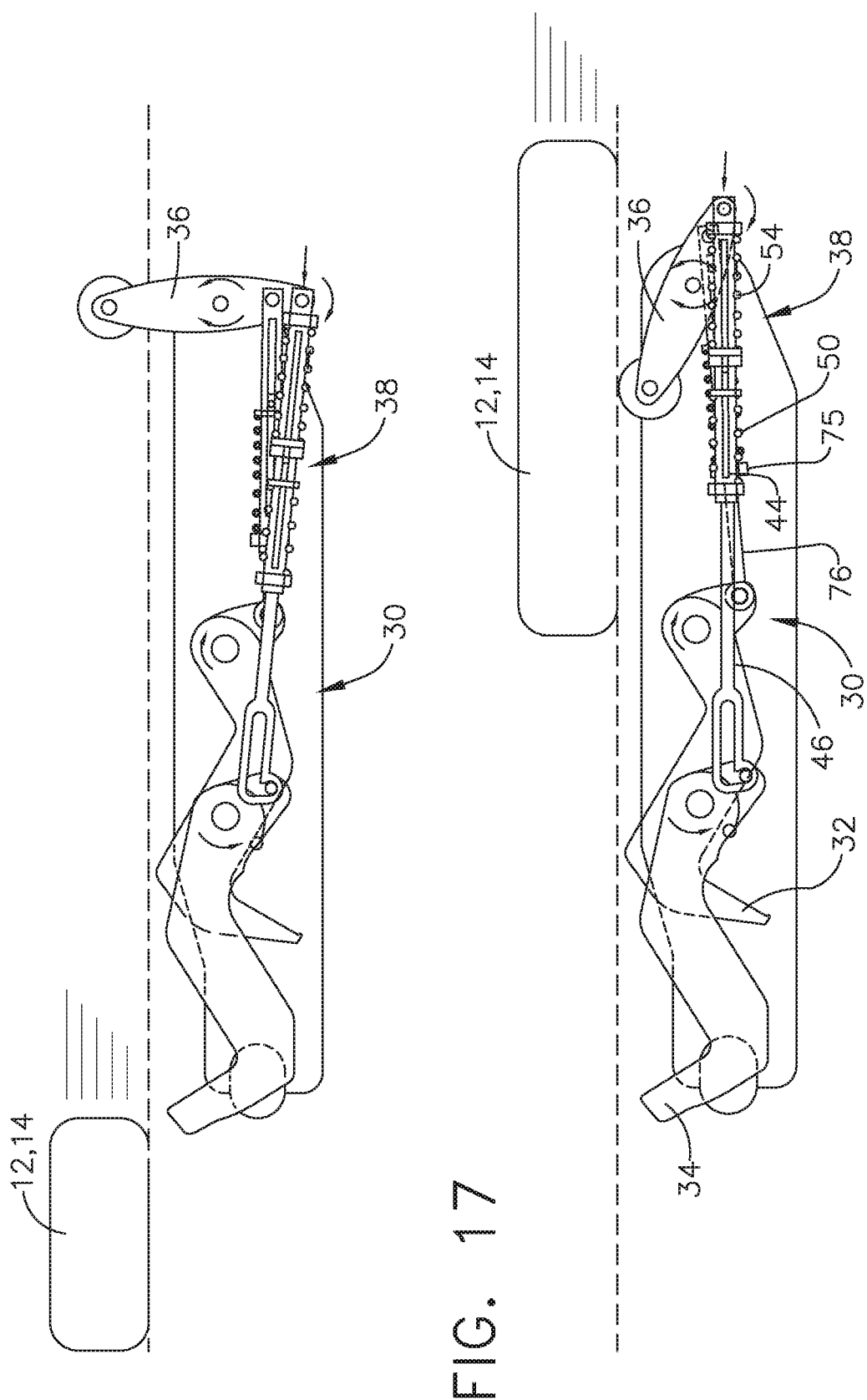

VEHICLE CARGO RESTRAINT SYSTEM

FIELD

The disclosure is generally related to cargo restraint systems, and more specifically is related to aircraft cargo restraint systems.

BACKGROUND

Modern aircraft currently carry cargo in specially designed containers, or the cargo is loaded on a flat pallet. The containers and pallets are loaded into the aircraft on rollers that are attached to the floor of the aircraft so that the containers and pallets may be rolled to a desired location in the aircraft. Some other types of transportation (e.g., trucks, ships, and trains) use similar types of cargo loading systems.

Aircraft are sensitive to the weight and balance generated by cargo containers and pallets. The container or pallet must remain fixed in a loaded position so that it does not move around during flight, which could affect aircraft control. As a result, current aircraft cargo systems also include cargo locks, which prevent movement of the containers and pallets once loaded.

Current cargo locks are manually operated. An operator must individually lower all locks before loading or unloading cargo. After cargo is loaded, each lock must be individually raised to lock the containers and pallets in place. Besides being time consuming, since each lock must be individually raised and lowered, there is a possibility that a lock may not be extended, if ground personnel get distracted during the loading process. Unlocked cargo containers and pallets can adversely affect aircraft handling characteristics if the containers or pallets move during flight. Additionally, manual operation of current locks has possibility of injury to the operator, such as pinching or crushing of fingers and hands.

SUMMARY

In a first example, a cargo restraint system comprises a cargo conveyor system, which includes a plurality of rollers, and a cargo restraint. The cargo restraint includes an inner pawl rotatably attached to the cargo conveyor system and an outer pawl rotatably attached to the cargo conveyor system. A lever is rotatably attached to the cargo loading system. A mechanical linkage connects the lever to the outer pawl and to the inner pawl, the outer pawl and the inner pawl being controlled by movement of the lever through the mechanical linkage.

In a second example, an aircraft cargo restraint system comprises a cargo conveyor system installed on a cargo floor of the aircraft and a cargo restraint. The cargo loading system includes a plurality of rails and a plurality of rollers. The cargo restraint includes an inner pawl rotatably attached to a first rail in the plurality of rails and an outer pawl rotatably attached to the first rail in the plurality of rails. A lever is rotatably attached to the first rail in the plurality of rails. A mechanical linkage connects the lever to the outer pawl and to the inner pawl, the outer pawl and the inner pawl being controlled by movement of the lever through the mechanical linkage.

In a third example, a method of securing cargo in an aircraft comprises placing a cargo carrying platform on a roller of a cargo conveyor system. The cargo carrying platform is moved over the roller. A lever of a cargo restraint system is contacted by the cargo carrying platform. The lever is rotated, which raises a cargo securing pawl. A cargo release pawl is raised by the cargo securing pawl.

Any of the foregoing first, second, and third examples may include any one or more of the following optional forms.

In one optional form, the mechanical linkage comprises a lift linkage and a retract linkage.

In another optional form, the lift linkage is operably connected to the outer pawl.

In yet another optional form, the lift linkage comprises a lift cylinder and a lift rod that is slidably attached to the lift cylinder, the lift rod and the lift cylinder sharing a substantially common longitudinal axis.

In yet another optional form, the lift linkage further comprises a first biasing element proximate a first end of the lift cylinder and a second biasing element proximate a second end of the lift cylinder.

In yet another optional form, the lift cylinder comprises an annular ridge between the first biasing element and the second biasing element.

In yet another optional form, the lift cylinder comprises a longitudinal slot and the lift rod comprises a lift pin that slides within the longitudinal slot, the lift pin being disposed between the first biasing element and the second biasing element.

In yet another optional form, the lift rod comprises an outer pawl attachment having an angled channel and the outer pawl includes a lift pin that is slidably disposed in the angled channel.

In yet another optional form, the retract linkage is mechanically connected to the inner pawl.

In yet another optional form, the retract linkage comprises a retract cylinder and a retract rod that is slidably connected to the retract cylinder, the retract cylinder and the retract rod sharing a substantially common longitudinal axis.

In yet another optional form, the retract linkage further comprises a first biasing element proximate a first end of the retract cylinder.

In yet another optional form, the retract cylinder comprises a longitudinal slot and the retract rod comprises a retract pin that slides within the longitudinal slot.

In yet another optional form, the outer pawl includes a sight hole that aligns with a sight hole in the cargo loading system when the outer pawl is in a locked position.

The third example, may include any one or more of the following optional forms.

In one optional form, the cargo carrying platform continues to move across the lever until the cargo carrying platform clears the lever; and the lever is raised after the cargo carrying platform is clear, which retracts the cargo release pawl and the cargo release pawl retracts the cargo securing pawl.

In another optional form, a force is applied to the cargo release pawl, thereby retracting the release pawl, which retracts the cargo securing pawl.

The features, functions, and advantages that have been discussed can be achieved independently in various embodiments or may be combined in yet other embodiments further details of which can be seen with reference to the following description and drawings.

BRIEF SUMMARY OF THE DRAWINGS

FIG. 5 is a side schematic view of the cargo restraint system of FIG. 4A, with a cargo container or pallet being loaded.

FIG. 6 is a side schematic view of the cargo restraint system of FIG. 4A, with a cargo container or pallet activating a lever as the cargo container or pallet is moved to a next cargo station.

FIG. 8 is a side schematic view of the cargo restraint system of FIG. 4A, with a cargo container or pallet releasing the lever and the inner pawl beginning to retract.

FIG. 9 is a side schematic view of the cargo restraint system of FIG. 4A, with the lever released and the inner pawl continuing to retract and the outer pawl beginning to retract.

FIG. 11 is a side schematic view of the cargo restraint system of FIG. 4A, with a cargo container or pallet in a loaded position, the outer pawl and the inner pawl being extended and restraining the cargo container or pallet.

FIG. 12 is a side schematic view of the cargo restraint system of FIG. 4A, with a cargo container or pallet in a loaded position and the inner pawl being activated to retract in preparation for removing the cargo container or pallet.

FIG. 13 is a side schematic view of the cargo restraint system of FIG. 4A, with a cargo container or pallet in loaded position and the inner pawl being retracted and the outer pawl beginning to retract.

FIG. 14 is a side schematic view of the cargo restraint system of FIG. 4A, with a cargo container or pallet in a loaded position and both the inner pawl and the outer pawl being retracted so that the cargo container or pallet may be unloaded.

FIG. 17 is a side schematic view of the cargo restraint system of FIG. 4A, with a cargo container or pallet beginning to be unloaded from the cargo station and the lever being released, the cargo container or pallet clears the outer pawl and the inner pawl while the outer pawl is held in the retracted position by the lift linkage and the inner pawl is held in the retracted position by the retract linkage.

FIG. 18 is a side schematic view of the cargo restraint system of FIG. 4A, with a cargo container or pallet from another cargo station beginning to be unloaded and moving through the illustrated cargo station, the lever being depressed, which holds the outer pawl and the inner pawl in the retracted position.

DESCRIPTION

Figure 1:
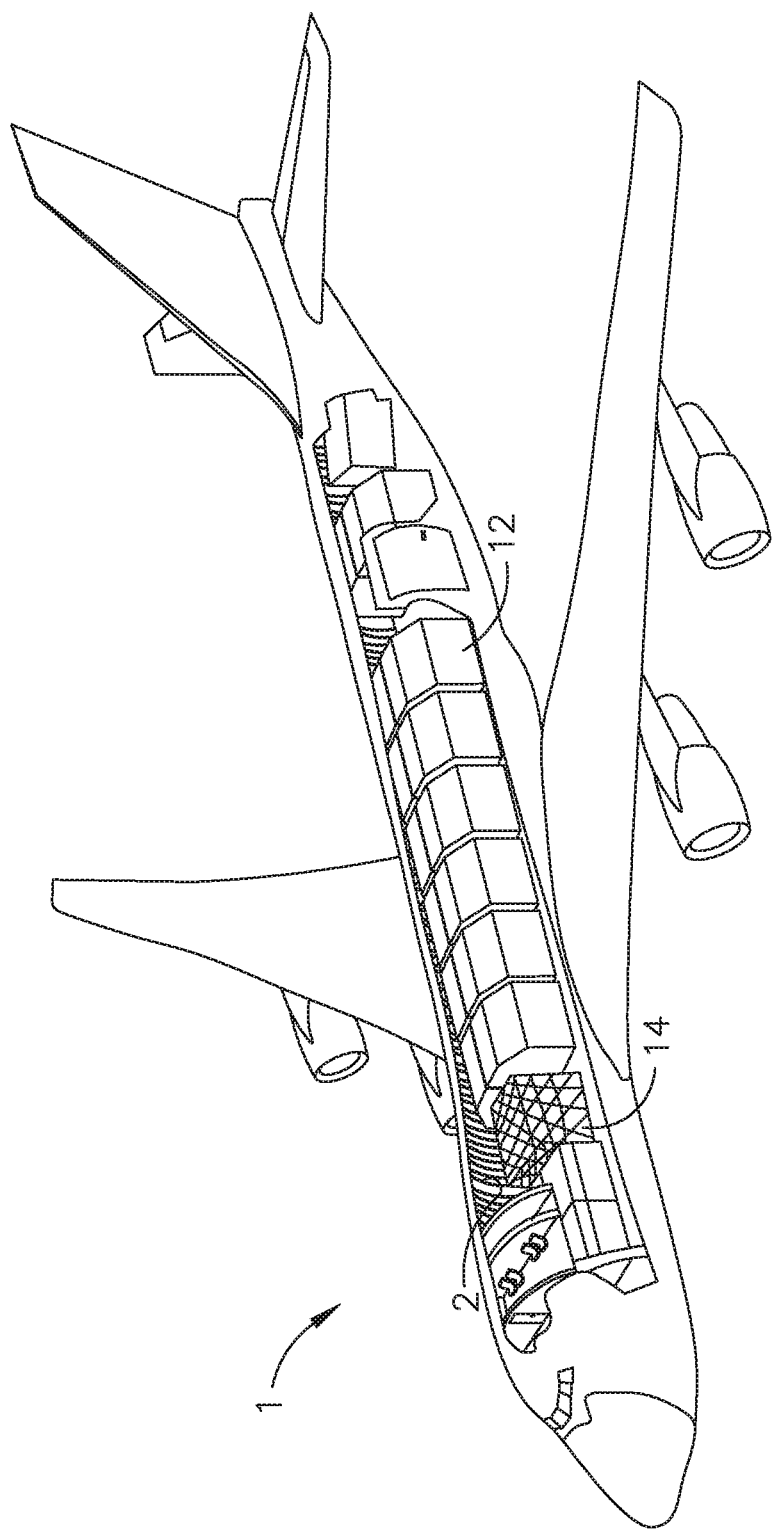
FIG. 1 is a cut away perspective view of an aircraft loaded with cargo containers and pallets.

Turning now to FIG. 1, an aircraft 1 includes a cargo compartment 2 (sometimes referred to as a cargo bay). The aircraft 1 may include a single cargo compartment 2, as illustrated in FIG. 1, the aircraft 1 may include multiple cargo compartments 2 (e.g., an upper cargo compartment and a lower cargo compartment), or the aircraft 1 may include a passenger compartment (not shown) and a cargo compartment 2 (e.g., the cargo compartment may be located below the passenger compartment).

The cargo compartment 2 may contain one or more cargo containers 12 and/or one or more cargo pallets 14 for transport to a location. A cargo container 12 is an enclosed structure having a body that maintains its exterior shape. Individual pieces of cargo may be placed inside the cargo container 12. An advantage of the cargo container 12 is that the volume of the cargo container 12 is fixed and known to fit in the cargo compartment 2 so that the cargo container 12 is easily loaded into the cargo compartment 2. Additionally, the external body of the cargo container 12 restrains movement of individual cargo pieces during loading, unloading, and flight. A bottom of the cargo container 12 is generally flat and capable of rolling on rollers of a cargo loading system (discussed further below).

Individual pieces of cargo may alternatively be loaded on the cargo pallet 14. The cargo pallet 14 is a generally flat metal structure (although in other embodiments, the pallet may be formed of other materials, such as wood or plastic). The individual cargo pieces may be secured to the cargo pallet 14 by a net or other structure (such as a plurality of straps) to prevent movement of the individual cargo pieces during loading, unloading, or flight. The cargo compartment 2 may be capable of carrying multiple cargo containers 12 and multiple cargo pallets 14 in a variety of configurations. Like the cargo container 12, a bottom of the cargo pallet 14 is generally flat and capable of rolling on rollers of the cargo loading system.

Figure 2:
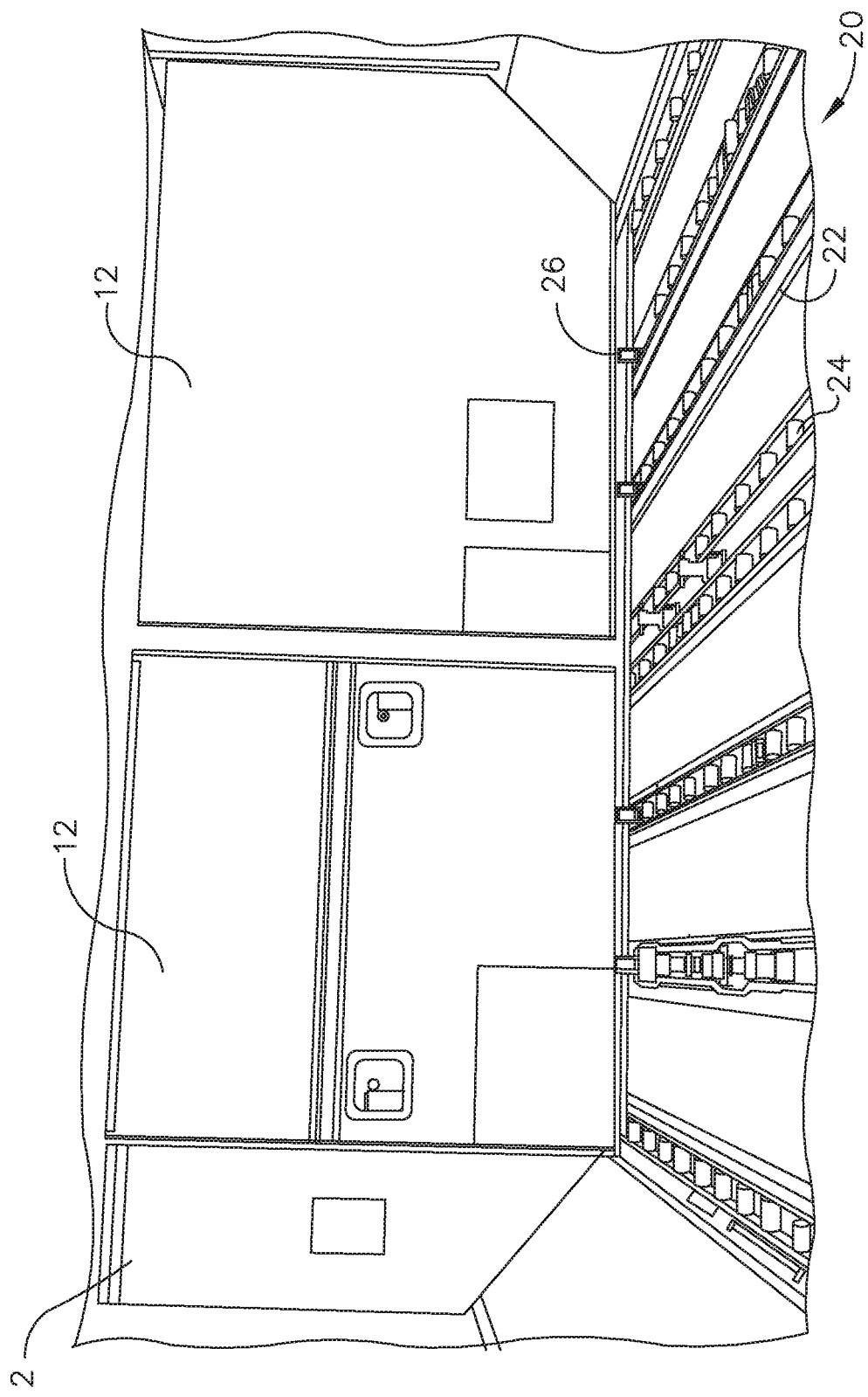
FIG. 2 is an inside view of the aircraft cargo compartment loaded with cargo containers.
Figure 3:
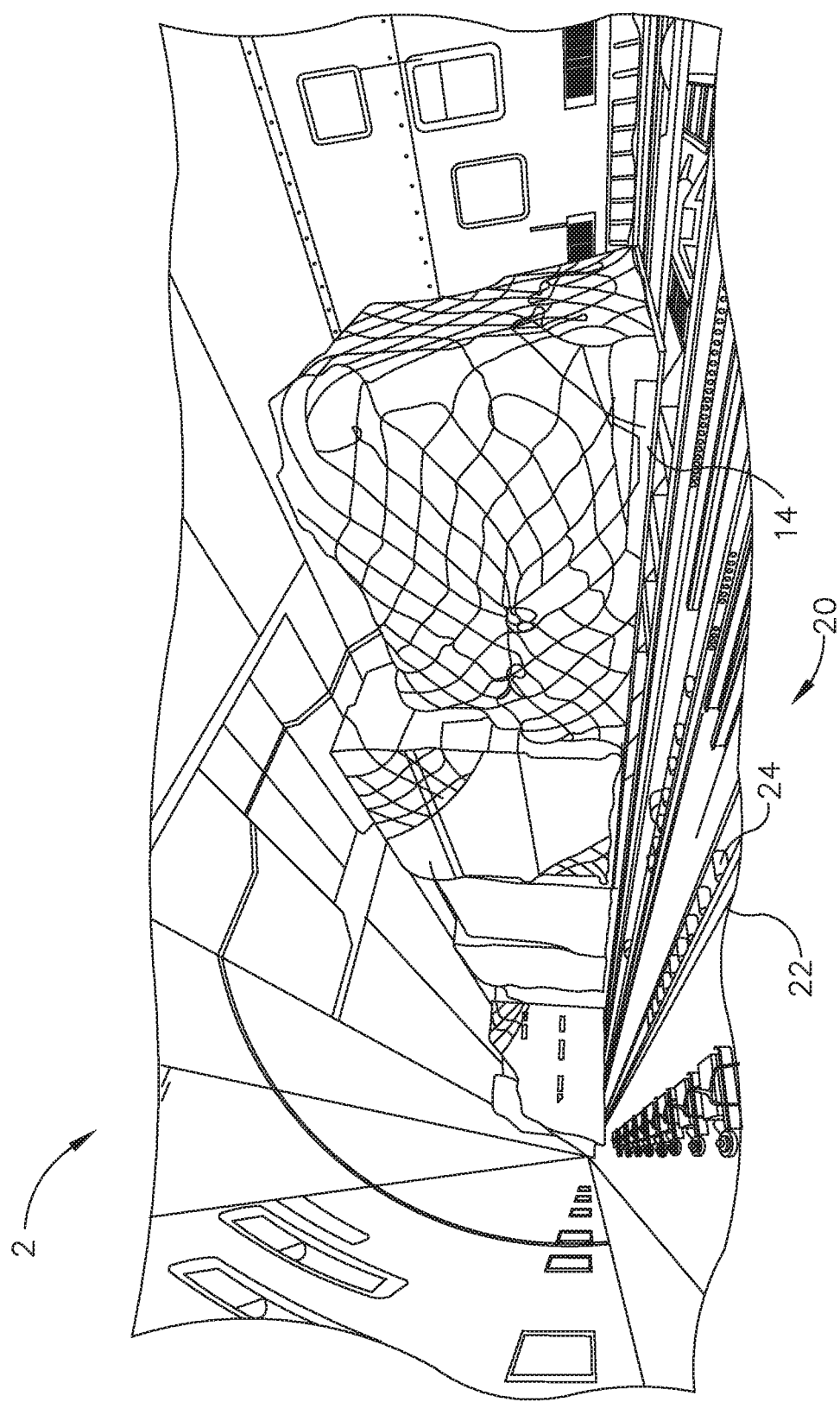
FIG. 3 is an inside view of an aircraft cargo compartment loaded with cargo pallets.

Turning now to FIGS. 2 and 3, two different close up views of the cargo compartment 2 are illustrated. In these examples, cargo containers 12 and/or cargo pallets 14 are loaded in the cargo compartment 2. The cargo compartment 2 includes a cargo conveyor system 20. The cargo conveyor system 20 comprises a plurality of rails 22 and a plurality of rollers 24.

The rails 22 in this example are oriented substantially parallel to a longitudinal axis of the aircraft 1. In other examples, the rails 22 may be oriented substantially perpendicular to the longitudinal axis of the aircraft 1, or the rails 22 may be oriented in a combination of orientations substantially parallel to the longitudinal axis of the aircraft 1, substantially perpendicular to the longitudinal axis of the aircraft 1, and/or angled with respect to the longitudinal axis of the aircraft 1.

The rollers 24 are disposed between two adjacent and parallel rails 22. The rollers 24 have a rotational axis that is substantially perpendicular to the rails 22. The rollers 24 in this example are substantially cylindrical in shape and may comprise a durable outer surface, such as aluminum or other metal. In other examples, the rollers 24 may have other shapes, such as spherical or partially spherical, as long as the rollers 24 are capable of supporting a cargo container 12 or a cargo pallet 14 while allowing the cargo container 12 or the cargo pallet 14 to move or roll across the roller 24 during loading and unloading of the cargo container 12 or the cargo pallet 14 from the cargo compartment.

The cargo conveyor system 20 may also include one or more cargo locks 26. The cargo locks 26 are extendable to secure the cargo container 12 or the cargo pallet 14 in a selected cargo location, which may be referred to as a cargo station. The cargo locks 26 are retractable during loading and unloading so that the cargo containers 12 or cargo pallets 14 are movable over the rollers 24.

Figure 4A:
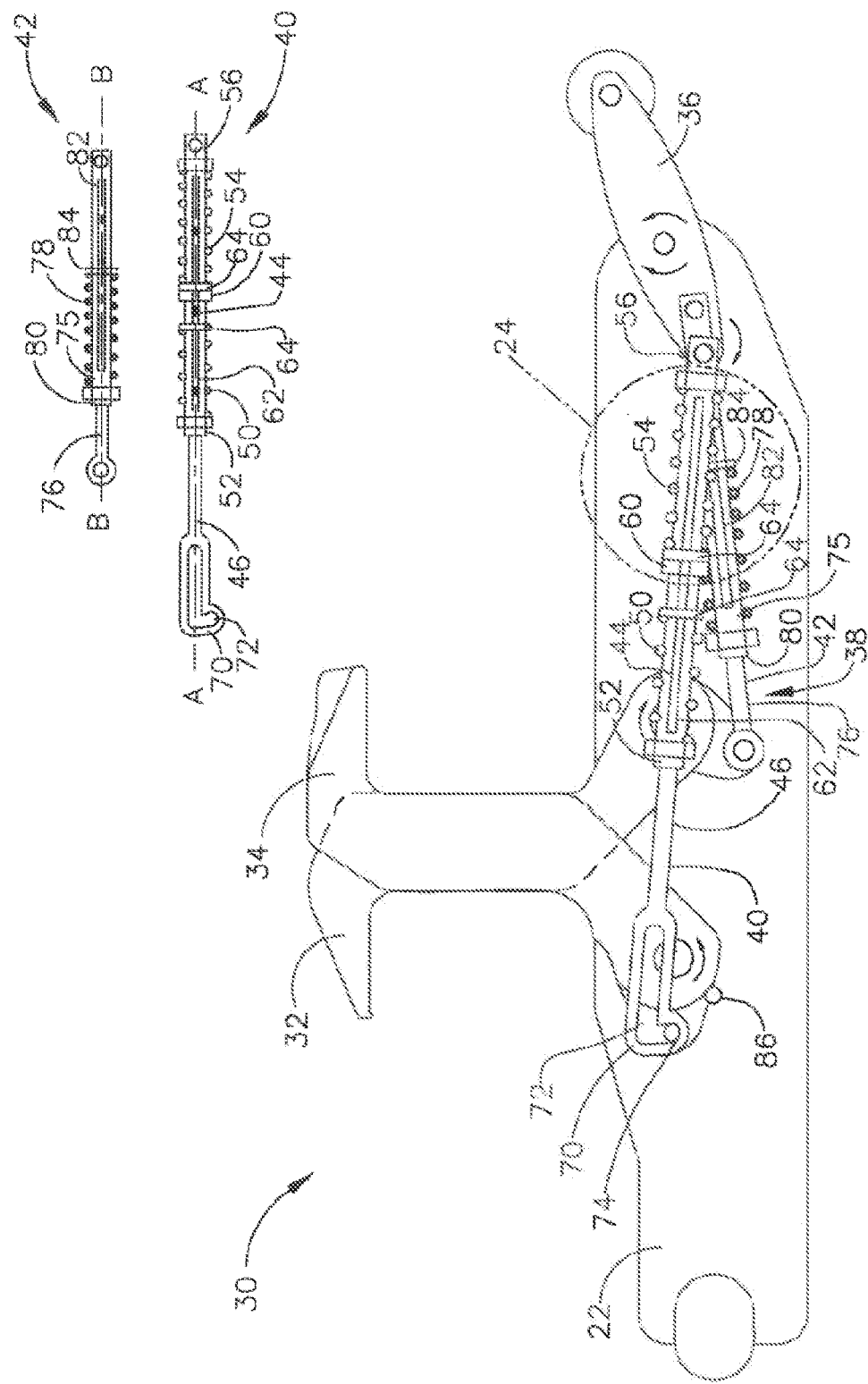
FIG. 4A is a side schematic view of a cargo restraint system constructed in accordance with the disclosure, an outer pawl and an inner pawl being in an extended position.
Figure 4B:
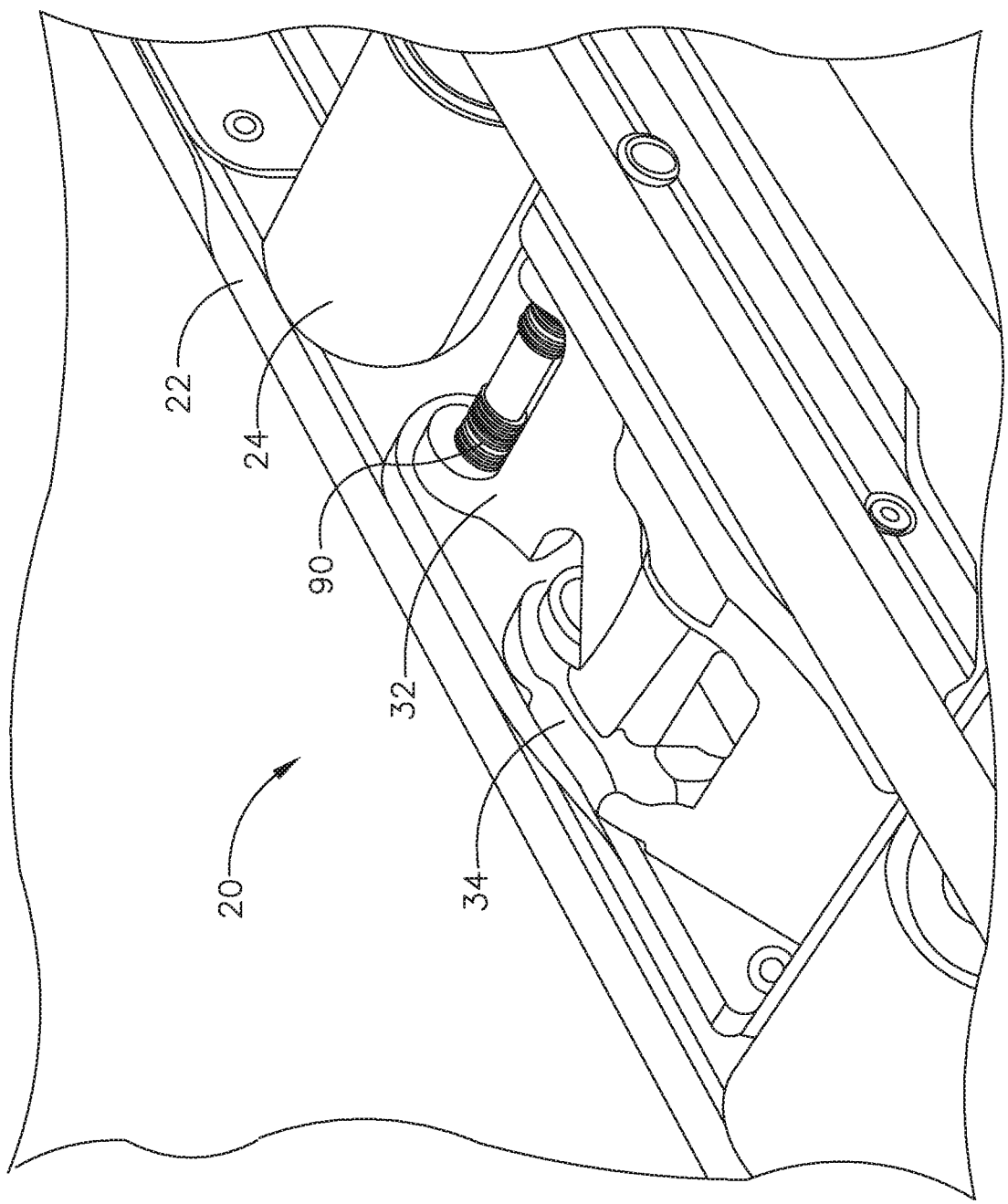
FIG. 4B is a partial perspective view of the cargo restraint system of FIG. 4A with a retracted outer pawl and a retracted inner pawl.
Figure 7:
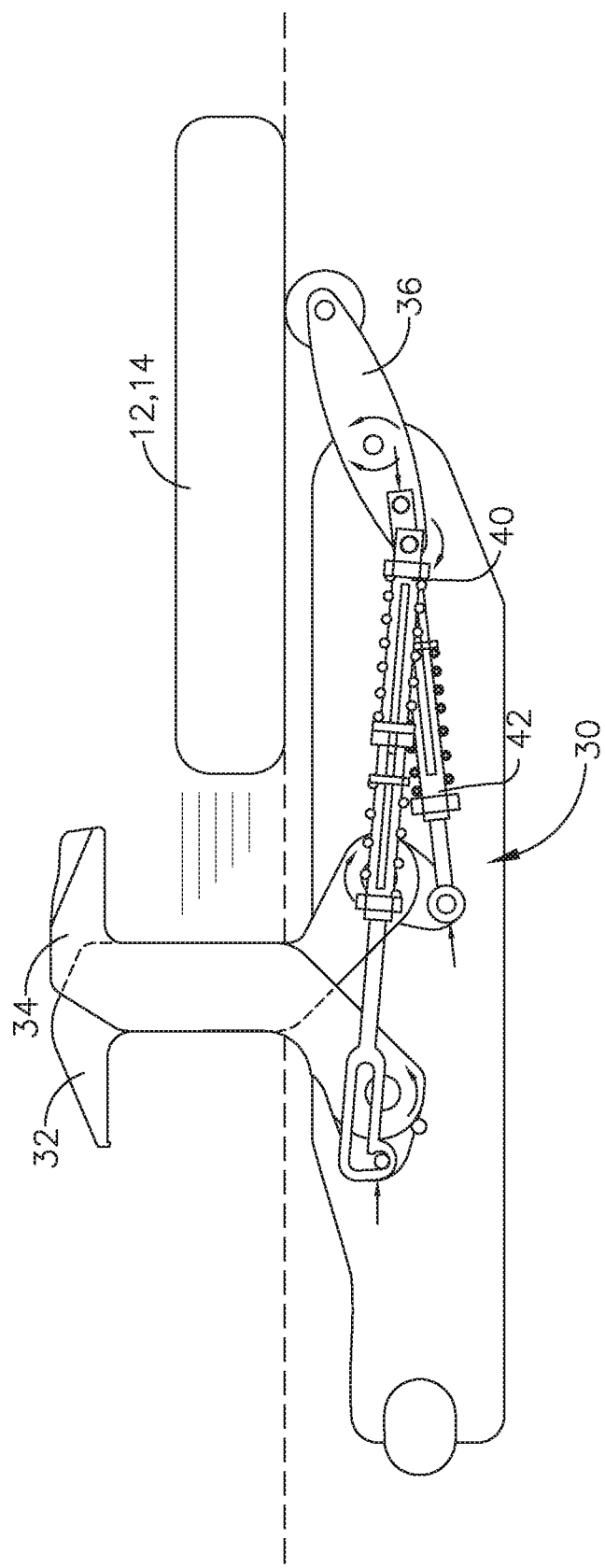
FIG. 7 is a side schematic view of the cargo restraint system of FIG. 4A, with the outer pawl and the inner pawl extended and the cargo container or pallet moving to the next cargo station.

Turning now to FIGS. 4A and 4B, a cargo restraint system 30 is illustrated. The cargo restraint system 30 comprises the cargo conveyor system 20 illustrated in FIGS. 2 and 3, an inner pawl 32 (or cargo release pawl), an outer pawl 34 (or cargo securing pawl), a lever 36, and a mechanical linkage 38.

The inner pawl 32 is rotatably attached to the cargo conveyor system 20. More specifically, the inner pawl 32 is rotatably attached to one or more rails 22 of the cargo conveyor system 20. The inner pawl 32 is rotatable about an axis that is substantially perpendicular to the rails 22, so that the inner pawl 32 may be rotated to an extended position, as illustrated in FIG. 4A, or a retracted position, where the inner pawl 32 is located between adjacent rails 22, as will be discussed further below.

The outer pawl 34 is also rotatably attached to the cargo conveyor system 20. More specifically, the outer pawl 34 is rotatably attached to one or more of the rails 22 of the cargo conveyor system 20. The outer pawl 34 is rotatable about an axis that is substantially perpendicular to the rails 22, so that the outer pawl 34 may be rotated to an extended position, as illustrated in FIG. 4A, or a retracted position, where the outer pawl 34 is located between adjacent rails 22, as will be discussed further below.

The lever 36 is also rotatably attached to the cargo conveyor system 20. More specifically, the lever 36 is rotatably attached to one of the rails 22 of the cargo conveyor system 20. The lever 36 is rotatable about an axis that is substantially perpendicular to the rail 22, so that the lever 36 may be rotated from an extended position (FIG. 5), to a first retracted position (FIG. 6), and to a second retracted position (FIG. 18).

The mechanical linkage 38 operatively connects the lever 36 to the outer pawl 34 and to the inner pawl 32. The outer pawl 34 and the inner pawl 32 are controlled by movement of the lever 36 through the mechanical linkage 38. More specifically, actuation of the lever 36 may either extend or retract the outer pawl 34 and the inner pawl 32 through various interactions with the mechanical linkage 38, which are discussed further below.

The mechanical linkage 38 comprises a lift linkage 40 and a retract linkage 42. The lift linkage 40 is operably connected to the outer pawl 34. The lift linkage 40 comprises a lift cylinder 44 and a lift rod 46 that is slidably attached to the lift cylinder 44. The lift rod 46 and the lift cylinder 44 share a substantially common longitudinal axis A. The lift linkage 40 further comprises a first biasing element 50 proximate a first end 52 of the lift cylinder 44 and a second biasing element 54 proximate a second end 56 of the lift cylinder 44. The lift cylinder 44 comprises an annular ridge 60 between the first biasing element 50 and the second biasing element 54.

The lift cylinder 44 comprises a longitudinal slot 62 and the lift rod 46 comprises one or more lift pins 64 that slide within the longitudinal slot 62. The lift pins 64 are disposed between the first biasing element 50 and the second biasing element 54. The lift rod 46 comprises an outer pawl attachment 70 having an angled channel 72. The outer pawl 34 includes a lift pin 74 that is slidably disposed in the angled channel 72.

Turning now to the retract linkage 42, the retract linkage 42 is mechanically connected to the inner pawl 32. The retract linkage 42 comprises a retract cylinder 75 and a retract rod 76 that is slidably connected to the retract cylinder 75. The retract cylinder 75 and the retract rod 76 share a substantially common longitudinal axis B.

The retract linkage 42 further comprises a first biasing element 78 proximate a first end 80 of the retract cylinder 75. The retract cylinder 75 comprises a longitudinal slot 82 and the retract rod 76 comprises a retract pin 84 that slides within the longitudinal slot 82.

In some embodiments, the outer pawl 34 includes a sight hole 86 that aligns with a sight hole in the cargo loading system when the outer pawl 34 is in a locked position. A laser may be projected through the sight holes to indicate that the outer pawl 34 is in the locked position as an extra measure of safety after cargo is loaded. When the outer pawl 34 is in a non-extended position, the sight hole 86 is blocked by a portion of the outer pawl 34 and thus laser light would be blocked, indicating that the outer pawl 34 is not in the extended position. A similar laser sight hole indication system is disclosed in U.S. patent application Ser. No. 15/936,540, the entirety of which is hereby incorporated by reference herein.

Turning now to FIGS. 5-10, a method of securing cargo in an aircraft is described. In FIGS. 5-10, a cargo pallet 14 or a cargo container 12 is being loaded into a cargo compartment of an aircraft. The cargo restraint system 30 is located at a cargo station, or at a location in the cargo conveyor system 20, which is located in a cargo compartment 2 of the aircraft. The particular cargo pallet 14 or cargo container 12 in FIGS. 5-10 is being loaded and moved through the cargo station illustrated, and on to another cargo station further downline. In order to move through this particular cargo station (i.e., to a cargo station further downstream in the cargo compartment), the outer pawl 34 and the inner pawl 32 must remain in the retracted position to allow the cargo pallet 14 or cargo container 12 to move through the cargo station.

Initially, in FIG. 5, the cargo pallet 14 or cargo container 12 is placed on a roller 24 (which is omitted from FIGS. 5-19 for clarity) of the cargo conveyor system 20. The cargo pallet 14 or cargo container 12 is moved over the roller 24, towards the lever 36. In an unactuated condition, or cargo loading position, the lever 36 is normally upright, as illustrated in FIG. 5. The outer pawl 34 and the inner pawl 32 are maintained in a retracted position by the mechanical linkage 38, between the rails 22 and below an uppermost point of the outer surface of the roller 24 (i.e., the point of contact between the roller 24 and the cargo pallet 14 or cargo container 12) so that the outer pawl 34 and the inner pawl 32 do not impede movement of the cargo pallet 14 or cargo container 12 over the roller 24. A plane formed by the uppermost points of the rollers is illustrated by dashed line R in FIGS. 5-20. Plane R is the plane that the cargo pallet 14 or cargo container 12 rests upon while being loaded or unloaded.

As the cargo pallet 14 or cargo container 12 is moved through the cargo station (FIG. 6), eventually the cargo pallet 14 or the cargo container 12 contacts the lever 36 of the cargo restraint system 30. The lever 36 rotates in response to the contact (clockwise in FIG. 6) and the mechanical linkage 38 raises the outer pawl 34, which in turn raises the inner pawl 32 from the retracted position, but the outer pawl 34 and the inner pawl 32 remain in the retracted position due to contact with the bottom of the cargo pallet 14 or cargo container 12. The outer pawl 34 and the inner pawl 32 are biased by biasing elements, such as pawl springs 90, to rotate in a given direction. When the mechanical linkage 38 releases the outer pawl 34 and the inner pawl 32 from the retracted position, the outer pawl 34 and the inner pawl 32 begin to rise, but are stopped by the weight of the cargo pallet 14 or cargo container 12.

As the cargo pallet 14 or cargo container 12 clears the outer pawl 34 and the inner pawl 32 (FIG. 7), the pawl springs 90 drive the outer pawl 34 and the inner pawl 32 to the extended (upright or deployed) position. The lever 36 is still held down by the weight of the cargo pallet 14 or cargo container 12, which forces the lift linkage 40 and the retract linkage 42 to the left in FIG. 7, thereby relieving any tension that would prevent the pawl springs 90 from fully extending the outer pawl 34 and the inner pawl 32. If the cargo pallet 14 or cargo container 12 were correctly positioned for the given cargo station, then the outer pawl 34 and the inner pawl 32 would remain extended and the cargo pallet 14 or cargo container 12 would remain restrained in the cargo station, which is illustrated in FIG. 11.

However, if the cargo pallet 14 or the cargo container 12 continues to move through the cargo station to another cargo station, eventually, the cargo pallet 14 or the cargo container 12 moves off of the lever 36, which is illustrated in FIG. 8. As the cargo pallet 14 or cargo container 12 clears the lever 36, lever biasing elements, such as lever springs 92 begin to raise the lever 36. As the lever 36 rises, the lever 36 pulls the lift linkage 40 and the retract linkage 42 towards the lever 36. As the retract linkage 42 moves towards the lever 36, the retract rod 76 pulls on the bottom of the inner pawl 32, which causes the inner pawl 32 to begin to retract (as illustrated in FIG. 8).

Figure 10:
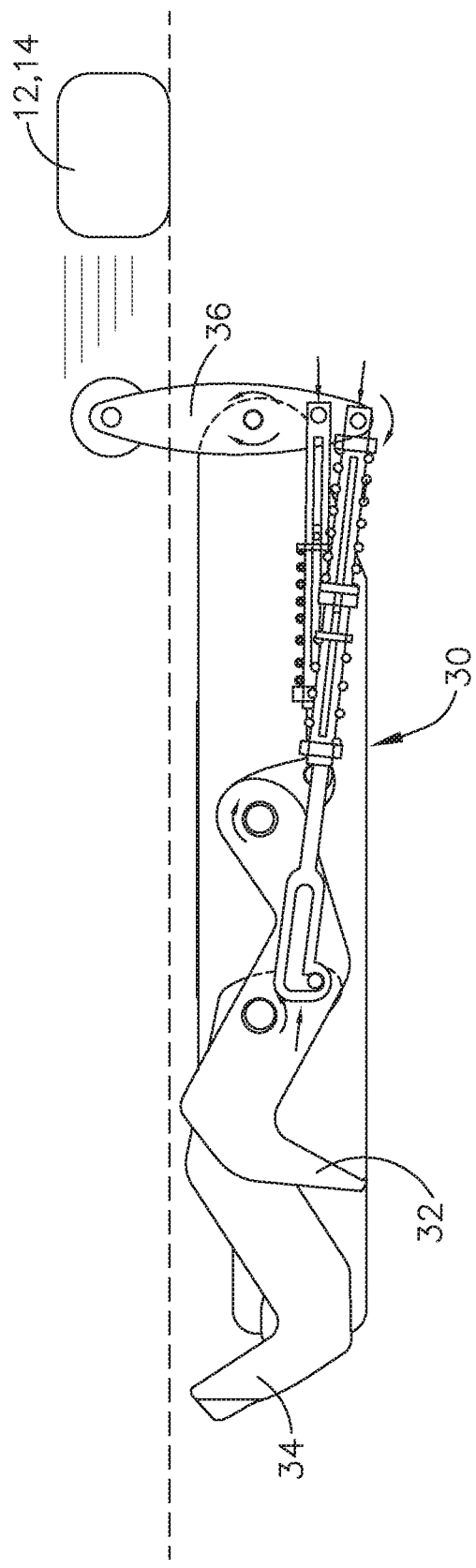
FIG. 10 is a side schematic view of the cargo restraint system of FIG. 4A, with the lever released and both the outer pawl and the inner pawl retracted.

As the lever 36 continues to rise, the lift rod 46 pulls on the lift pin 74, which causes the outer pawl 34 to begin to retract (as illustrated in FIG. 9). FIG. 10 illustrates the fully reset condition of the cargo restraint system 30. The lever 36 is fully extended and the outer pawl 34 and the inner pawl 32 are fully retracted. The cargo pallet 14 or cargo container 12 has moved past the cargo station and the cargo station is ready to receive another cargo pallet 14 or cargo container 12.

Turning now to FIGS. 12-17, a cargo removal sequence is illustrated. Initially, a force is applied to the inner pawl 32 in the direction of arrow F. This causes the inner pawl 32 to rotate towards the retracted position (counterclockwise in FIG. 12). As the inner pawl 32 rotates, the lift linkage 40 lowers and the lift pin 74 slides upward in the angled channel 72, which releases the outer pawl 34 from the locked position, as illustrated in FIG. 13. Once the outer pawl 34 is released, the pawl spring 90 rotates the outer pawl towards the retracted position. The lift pin 74 freely slides in the angled channel 72 to allow the rotation (FIG. 14). Once the outer pawl 34 and the inner pawl 32 are retracted, the cargo pallet 14 or cargo container 12 is movable out of the cargo station by rolling on the rollers 24.

Figure 15:
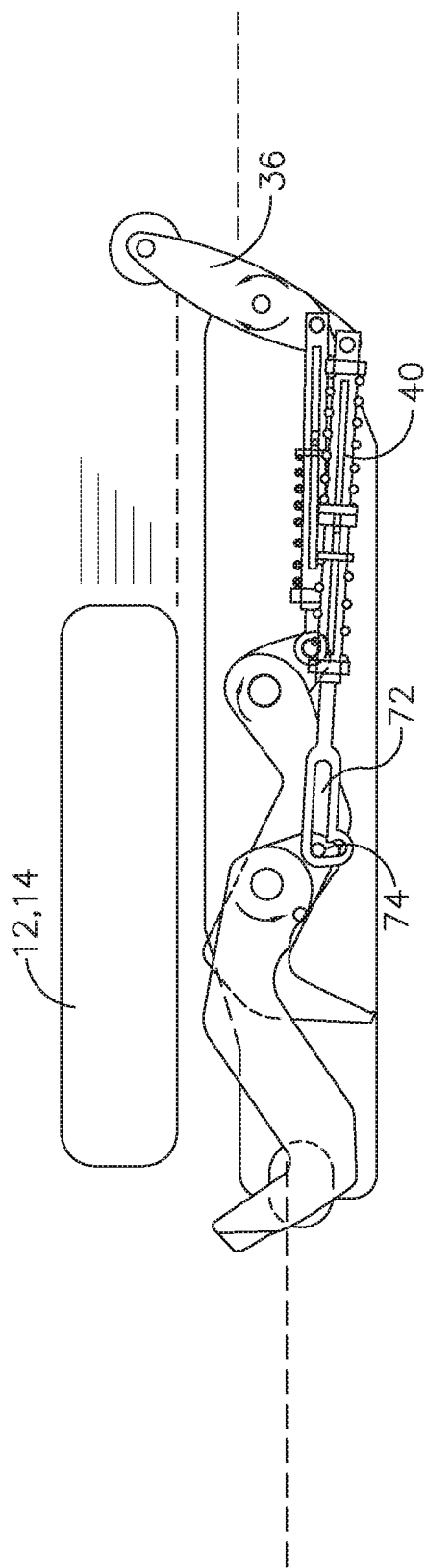
FIG. 15 is a side schematic view of the cargo restraint system of FIG. 4A, with a cargo container or pallet beginning to be unloaded from the cargo station and the lever being released.
Figure 16:
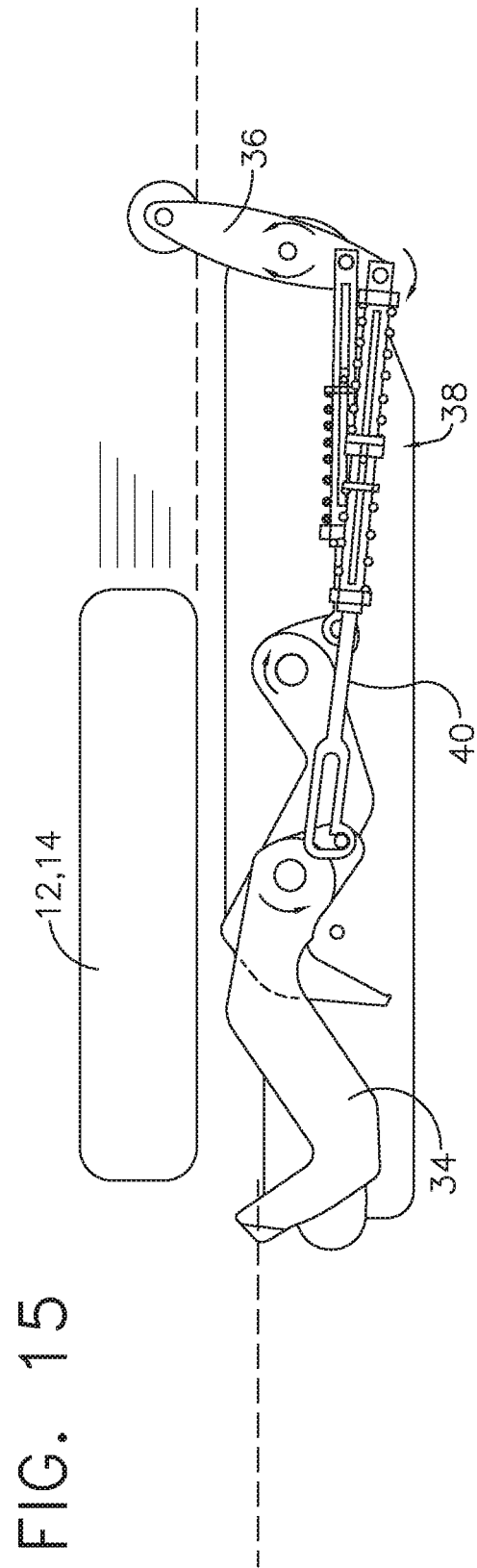
FIG. 16 is a side schematic view of the cargo restraint system of FIG. 4A, with a cargo container or pallet beginning to be unloaded from the cargo station and the lever being released, and a lift pin sliding into an angled slot in a lift linkage to hold the outer pawl in a retracted position.

As the cargo pallet 14 or cargo container 12 is moved out of the cargo station (FIG. 15) and the lever 36 is allowed to extend, the lift linkage 40 pulls to the right in FIG. 15 (towards the lever 36) and the lift pin 74 slides back towards the downward angled portion of the angled channel 72. Once the lift pin 74 is captured in the downward angled portion of the angled channel 72, further movement of the lift linkage 40 pulls the lift pin 74, which causes the outer pawl 34 to rotate towards the retracted position. (FIG. 16).

Once the cargo pallet 14 or cargo container 12 clears the outer pawl 34 and the inner pawl 32, the outer pawl 34 and the inner pawl are maintained in the retracted position by the extended lever 36 (FIG. 17), through the mechanical linkage 38. The cargo restraint system 30 is now ready to receive another cargo pallet 14 or cargo container 12.

Figure 19:
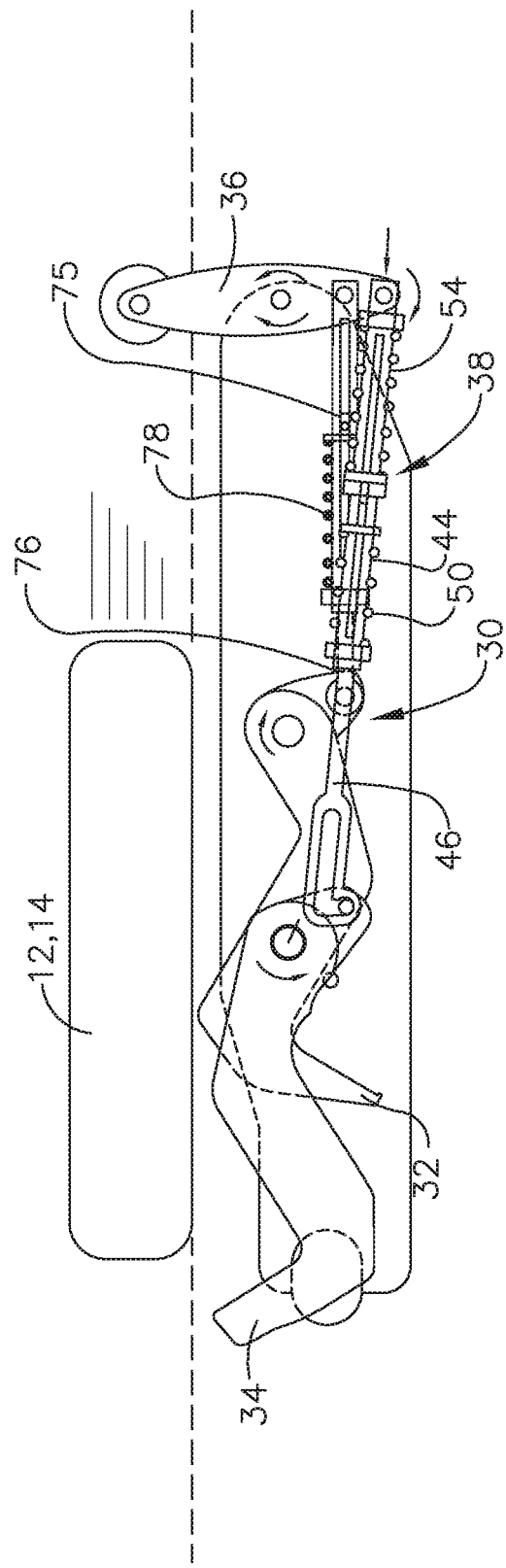
FIG. 19 is a side schematic view of the cargo restraint system of FIG. 4A, with a cargo container or pallet beginning to be unloaded from the cargo station and the lever being released, the outer pawl and the inner pawl being held in the retracted position.

FIGS. 18 and 19 illustrate a pass through sequence where a cargo pallet 14 or a cargo container 12 is moved through a cargo station during an unloading process. As the cargo pallet 14 or the cargo container 12 is moved from another cargo station towards the illustrated cargo station, the cargo pallet 14 or the cargo container 12 contacts the lever 36, which causes the lever 36 to rotate, counterclockwise in FIG. 18. The outer pawl 34 and the inner pawl 32 are maintained in the retracted position by the mechanical linkage 38. More specifically, as the lever 36 rotates, the lift rod 46 extends from the lift cylinder 44 and the retract rod 76 extend from the retract cylinder 75 to accommodate the increased distance created by the rotation of the lever 36. Once the cargo pallet 14 or the cargo container 12 clears the lever 36, the first and second biasing elements 50, 54 on the lift linkage 40 and the first biasing element 78 on the retract linkage 42 pull the lift rod 46 and the retract rod 76, which forces the lever 36 to the upright position and the cargo restraint system 30 is thereby reset for the next cargo pallet 14 or cargo container 12 (FIG. 19).

Figure 20:
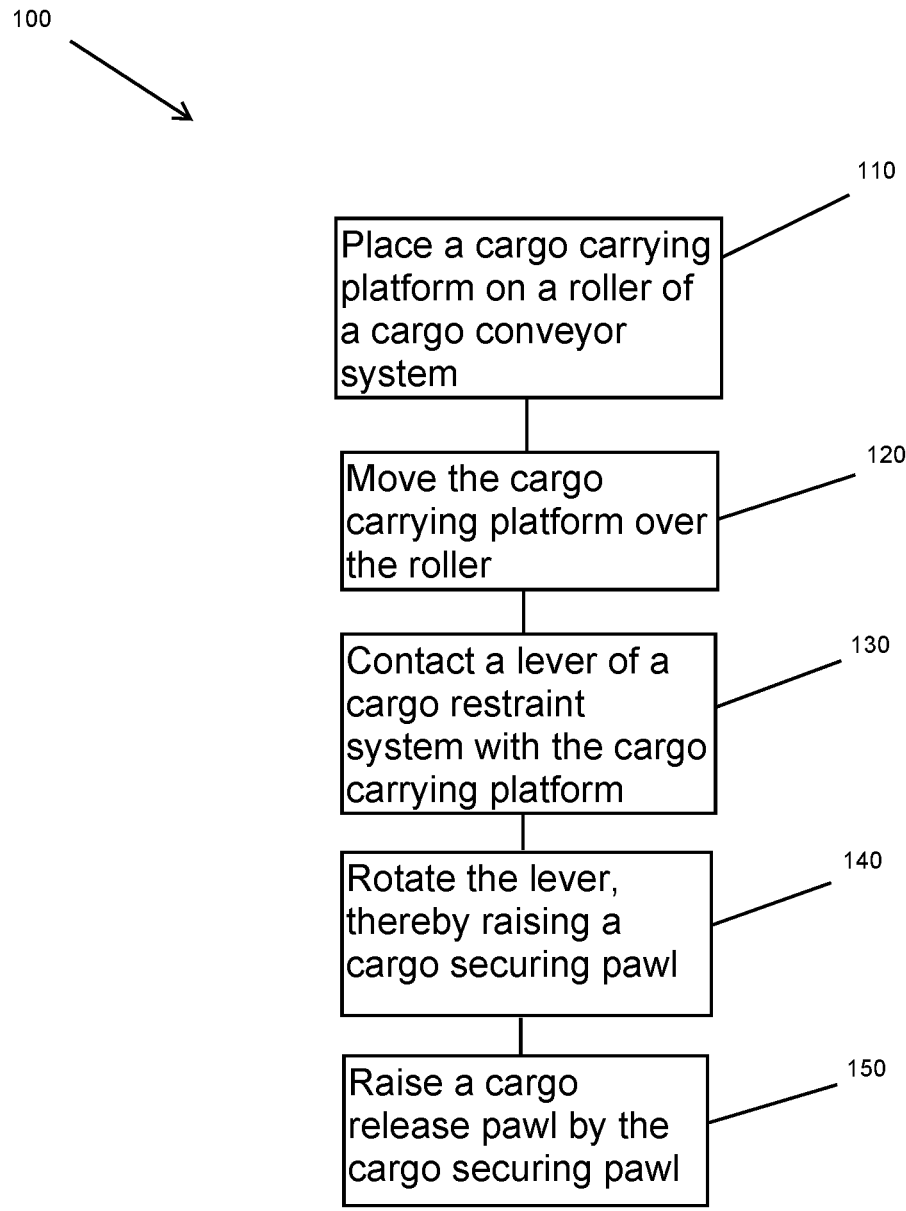
FIG. 20 is a logic diagram of a method of securing cargo in an aircraft using the cargo restraint system of FIG. 4A.

Turning now to FIG. 20, a logic diagram illustrates a method 100 of securing cargo in an aircraft that uses the cargo restraint system described above. Where elements of the cargo restraint system are described in FIG. 20, reference numbers correspond to the reference numbers in FIGS. 1-19, which should be referenced concurrently with FIG. 20 when needed to locate the elements described in FIG. 20.

Initially, a cargo carrying platform 12, 14 is placed on a roller 24 of a cargo conveyor system 20, at 110. The cargo carrying platform 12, 14 is then moved over the roller 24 at 120. A lever 36 of a cargo restraint system 30 is contacted by the cargo carrying platform 12, 14 at 130. The lever 36 is rotated at 140, which raises a cargo securing pawl 34 at 140. A cargo release pawl 32 is raised by the cargo securing pawl 34 at 150, which secures the cargo carrying platform 12, 14 in position at a given cargo station.

The method 100 may optionally include continuing to move the cargo carrying platform 12, 14 across the lever 36 until the cargo carrying platform 12, 14 clears the lever 36; and raising the lever 36 after the cargo carrying platform 12, 14 is clear, which retracts the cargo release pawl 32 and the cargo release pawl 32 retracts the cargo securing pawl 34, to prepare the cargo station to receive another cargo carrying platform 12, 14.

The method 100 may also optionally include applying a force to the cargo release pawl 32, thereby retracting the cargo release pawl 32, which retracts the cargo securing pawl 34, and allows a cargo carrying platform 12, 14 to be removed from the cargo station.

The disclosed cargo restraint systems and methods advantageously automatically secure cargo containers and pallets in place without the need to raise the restraints by hand and without using electric motors. As a result, loading time is reduced and the potential for injury to personnel is also reduced. The activation of the restraint is caused by movement of the cargo container or pallet, rather than by an electric motor or manual activation. Additionally, the disclosed cargo restraint systems and methods are more reliable than manual restraints, which reduces the possibility of cargo moving during flight.

While various embodiments have been described above, this disclosure is not intended to be limited thereto. Variations can be made to the disclosed embodiments that are still within the scope of the appended claims.

What is claimed:

1. A cargo restraint system comprising:
a cargo conveyor system including a plurality of rollers;
an inner pawl rotatably attached to the cargo conveyor system;
an outer pawl rotatably attached to the cargo conveyor system;
a lever rotatably attached to the cargo conveyor system;
a mechanical linkage connecting the lever to the outer pawl and to the inner pawl, the outer pawl and the inner pawl being controlled by movement of the lever through the mechanical linkage; and
wherein the mechanical linkage comprises a lift linkage operably connected to the outer pawl, and the lift linkage includes a lift cylinder and a lift rod slidably disposed inside of the lift cylinder.

2. The cargo restraint system of claim 1, wherein the lift rod and the lift cylinder share a substantially common longitudinal axis.

3. The cargo restraint system of claim 2, wherein the lift linkage further comprises a first spring disposed proximate a first end of the lift cylinder and a second spring disposed proximate a second end of the lift cylinder, wherein the first spring and the second spring surround the lift cylinder.

4. The cargo restraint system of claim 3, wherein the lift cylinder comprises an annular ridge disposed between the first spring and the second spring.

5. The cargo restraint system of claim 4, wherein the lift cylinder comprises a longitudinal slot and the lift rod comprises a lift pin that slides within the longitudinal slot, the lift pin being disposed between the first spring and the second spring.

6. The cargo restraint system of claim 2, wherein the lift rod comprises an outer pawl attachment having an angled channel and the outer pawl includes a lift pin that is slidably disposed in the angled channel.

7. The cargo restraint system of claim 1, wherein the mechanical linkage comprises a retract linkage mechanically connected to the inner pawl.

8. The cargo restraint system of claim 7, wherein the retract linkage comprises a retract cylinder and a retract rod that is slidably connected to the retract cylinder, wherein the retract cylinder and the retract rod share a substantially common longitudinal axis.

9. The cargo restraint system of claim 8, wherein the retract linkage further comprises a first spring proximate a first end of the retract cylinder.

10. The cargo restraint system of claim 9, wherein the retract cylinder comprises a longitudinal slot and the retract rod comprises a retract pin that slides within the longitudinal slot.

11. The cargo restraint system of claim 1, wherein the outer pawl includes a sight hole that aligns with another sight hole in the cargo conveyor system when the outer pawl is in a locked position.

12. The cargo restraint system of claim 1, wherein the lift linkage is connected to a distal end of the lever at a first pivot point, and a retract linkage is connected to the distal end of the lever at a second pivot point spaced from the first pivot point such that the first pivot point and the second pivot point are off-center from each other.

13. An aircraft cargo restraint system, comprising:
a cargo conveyor system installed on a cargo floor of an aircraft, the cargo conveyor system including a plurality of rails and a plurality of rollers;
an inner pawl rotatably attached to a first rail in the plurality of rails;
an outer pawl rotatably attached to the first rail in the plurality of rails;
a lever rotatably attached to the first rail in the plurality of rails via a central axis, wherein the lever includes a first end and a second end spaced from each other, with the central axis disposed between the first end and the second end, and wherein the lever includes a roller disposed along the first end; and
a mechanical linkage connecting the lever to the outer pawl and to the inner pawl, the outer pawl and the inner pawl being controlled by movement of the lever through the mechanical linkage, wherein the mechanical linkage comprises a lift linkage connected to the second end of the lever at a first pivot point, and a retract linkage connected to the second end of the lever at a second pivot point spaced from the first pivot point such that the first pivot point and the second pivot point are off-center from each other along the second end.

14. The aircraft cargo restraint system of claim 13, wherein the lift linkage is mechanically connected to the outer pawl and the retract linkage is mechanically connected to the inner pawl.

15. The aircraft cargo restraint system of claim 14, wherein the lift linkage comprises a lift cylinder and a lift rod that is slidably attached to the lift cylinder, wherein the lift rod and the lift cylinder share a substantially common longitudinal axis.

16. The aircraft cargo restraint system of claim 14, wherein the retract linkage comprises a retract cylinder and a retract rod that is slidably connected to the retract cylinder, wherein the retract cylinder and the retract rod share a substantially common longitudinal axis.

17. The aircraft cargo restraint system of claim 13, wherein the outer pawl includes a sight hole that aligns with another sight hole in the cargo conveyor system when the outer pawl is in a locked position.

18. The aircraft cargo restraint system of claim 13, wherein the second pivot point of the retract linkage is disposed between the central axis of the lever and the first pivot point of the lift linkage.

19. A method of securing cargo in an aircraft, the method comprising:
placing a cargo carrying platform on a roller of a cargo conveyor system;
moving the cargo carrying platform over the roller;
contacting a lever of a cargo restraint system with the cargo carrying platform;
rotating the lever, which raises a cargo securing pawl;
raising a cargo release pawl by the cargo securing pawl; and wherein rotating the lever causes movement of a lift linkage and a retract linkage independently of each other such that the lift linkage and the retract linkage move in different orientations relative to each other, wherein the lift linkage is connected to the lever at a first pivot point and connected to the cargo securing pawl, and the retract linkage is connected to the lever at a second pivot point and connected to the cargo release pawl, and wherein the first pivot point and the second pivot point are spaced from each other.

20. The method of claim 19, further comprising continuing to move the cargo carrying platform across the lever until the cargo carrying platform clears the lever; and raising the lever after the cargo carrying platform is clear, which retracts the cargo release pawl and the cargo release pawl retracts the cargo securing pawl.

21. The method of claim 19, further comprising applying a force to the cargo release pawl, thereby retracting the cargo release pawl, which retracts the cargo securing pawl.

\* \* \* \* \*